US012674247B2

(12) United States Patent
Li et al.

(10) Patent No.: US 12,674,247 B2
(45) Date of Patent: Jul. 7, 2026

(54) METHOD FOR CLEANING ELECTROPLATING DEVICE

(71) Applicant: ACM RESEARCH (SHANGHAI), INC., Shanghai (CN)

(72) Inventors: Jiaqi Li, Shanghai (CN); Jian Wang, Shanghai (CN); Zhaowei Jia, Shanghai (CN); Jianhua Diao, Shanghai (CN); Hongchao Yang, Shanghai (CN); Hui Wang, Shanghai (CN)

(73) Assignee: ACM RESEARCH (SHANGHAI), INC., Shanghai (CN)

( * ) Notice: Subject to any disclaimer, the term of this patent is extended or adjusted under 35 U.S.C. 154(b) by 109 days.

(21) Appl. No.: 18/721,110

(22) PCT Filed: Nov. 24, 2022

(86) PCT No.: PCT/CN2022/134114

§ 371 (c)(1),
(2) Date: Jun. 17, 2024

(87) PCT Pub. No.: WO2023/109465

PCT Pub. Date: Jun. 22, 2023

(65) Prior Publication Data

US 2025/0059671 A1 Feb. 20, 2025

(30) Foreign Application Priority Data

Dec. 17, 2021 (CN) ........................ 202111550193.4

(51) Int. Cl.
*C25D 21/08* (2006.01)
*B08B 9/08* (2006.01)

(52) U.S. Cl.
CPC ................ *C25D 21/08* (2013.01); *B08B 9/08* (2013.01)

(58) Field of Classification Search
CPC ............................ C25D 21/08; B08B 9/08–46
See application file for complete search history.

(56) References Cited

U.S. PATENT DOCUMENTS

2004/0016647 A1 1/2004 Yang et al.
2005/0092601 A1 5/2005 Herchen
(Continued)

FOREIGN PATENT DOCUMENTS

CN 207243447 U 4/2018
CN 111032923 A 4/2020
CN 212669846 U 3/2021

OTHER PUBLICATIONS

International Search Report issued in Application No. PCT/CN2022/134114, mailed on Nov. 24, 2022 (3 pages).
(Continued)

*Primary Examiner* — Kaj K Olsen
*Assistant Examiner* — Richard Z. Zhang
(74) *Attorney, Agent, or Firm* — Osha Bergman Watanabe & Burton LLP

(57) ABSTRACT

Disclosed in the present invention is a method for cleaning an electroplating device. When the electroplating device is cleaned, a partition is used for replacing an ionic membrane framework to separate a cathode chamber and an anode chamber, such that the cathode chamber and the anode chamber are independently cleaned. After an electroplating chamber is cleaned, an exhaust pipe is used for emptying the cleaning solution remaining in the anode chamber and in the liquid inlet channel arranged in a sidewall of the anode chamber, such that no cleaning solution remains after the electroplating chamber is cleaned, thereby eliminating the effect of the residual cleaning solution on the ionic concentration ratio of an electroplating solution in electroplating solution preparation procedures.

7 Claims, 7 Drawing Sheets

(56) References Cited

U.S. PATENT DOCUMENTS

| | | | | |
|---|---|---|---|---|
| 2011/0226613 | A1* | 9/2011 | Rash | C25D 21/14 204/237 |
| 2017/0241040 | A1* | 8/2017 | Sakurai | C22C 19/002 |
| 2020/0354851 | A1* | 11/2020 | Jia | C25D 17/12 |

OTHER PUBLICATIONS

Written Opinion issued in Application No. PCT/CN2022/134114, mailed on Nov. 24, 2022 (3 pages).

* cited by examiner

METHOD FOR CLEANING ELECTROPLATING DEVICE

BACKGROUND OF THE INVENTION

Field of the Invention

The present invention relates to the field of electroplating technology, more specifically, to a method for cleaning an electroplating device.

The Related Art

In the integrated circuit manufacturing process, advanced package electroplating process is a necessary process to obtain high-quality integrated circuits. The electroplating process is to supply the well-proportioned electroplating solution into the electroplating chamber via the circulation pipeline and electroplate on the surface of the wafer. The ion concentration ratio in the electroplating solution is one of the key factors that determine the quality of the electroplating process parameters. Therefore, it is necessary to use acid, alkali, ultra-pure water and other chemical liquids to rinse the electroplating chamber, liquid storage tank, and pipeline of the electroplating device before the electroplating process.

FIG. 6 shows an electroplating chamber of a conventional electroplating device. The electroplating chamber 500 has an anode chamber 501 and a cathode chamber 502 which surrounds the anode chamber 501. The ionic membrane framework 503 is fixed on the top of the anode chamber 501 to separate the anode chamber 501 and the cathode chamber 502 into two independent chambers. The anode chamber 501 has a sidewall and a bottom wall, wherein a liquid inlet port 5011 and a liquid outlet 5012 are provided on the bottom wall of the anode chamber 501. A liquid inlet channel 5021 is provided in the sidewall of the anode chamber 501, for supplying liquid to the cathode chamber 502. The cathode chamber 502 is also provided with a liquid outlet 5022. The liquid inlet channel 5021 is a non-vertical channel, generally a cavity with a certain shape. As shown in FIG. 7, the liquid inlet channel 5021 is a segmental cavity. After the electroplating device is cleaned by a conventional method, some liquid will remain in the electroplating chamber 500, especially in the liquid inlet channel 5021 with a certain shape, in which a large amount of cleaning solution will remain due to the existence of a dead drain space. In addition, the bottom of the anode chamber 501 is horizontally arranged, which also causes the cleaning solution in the anode chamber 501 being unable to be completely drained. All of these will affect the concentration ratio of ions during the preparation of the electroplating solution, and then affect the electroplating process. At present, the residual cleaning solution in electroplating chamber is replaced by electroplating solution to eliminate the effect of residual cleaning solution on the electroplating solution preparation procedures. However, it will result in a waste of electroplating solution. Therefore, it is necessary to develop a method for cleaning the electroplating device that is simple, convenient and can effectively empty the cleaning solution.

SUMMARY

The present invention aims to provide a method for cleaning an electroplating device, which can simply and conveniently clean an electroplating chamber, reduce the residue of cleaning solution in the electroplating chamber, and avoid the effect on the subsequent electroplating solution preparation procedures.

To achieve the above objective, the present invention provides a method of cleaning an electroplating device, wherein the electroplating device comprises an electroplating chamber having a cathode chamber and an anode chamber. A liquid inlet channel is arranged inside the sidewall of the anode chamber, for supplying liquid to the cathode chamber. The method comprises the following steps:

- providing a partition, which is installed between the cathode chamber and the anode chamber to separate the cathode chamber and the anode chamber;
- supplying cleaning solution into the cathode chamber to clean the cathode chamber;
- supplying cleaning solution into the anode chamber to clean the anode chamber;
- after the cathode chamber and the anode chamber are cleaned, drain the cleaning solution in the cathode chamber and the anode chamber through their respective liquid outlets;
- removing the partition from between the cathode chamber and the anode chamber;
- providing a first exhaust pipe, one end of the first exhaust pipe being placed into the liquid inlet channel provided in the sidewall of the anode chamber, the other end being connected to a pump, draining the cleaning solution in the liquid inlet channel through the pump;
- providing a second exhaust pipe, one end of the second exhaust pipe being placed into the anode chamber, the other end being connected to a pump, draining the cleaning solution in the anode chamber through the pump.

In one embodiment, the electroplating device also comprises an ionic membrane framework arranged between the anode chamber and the cathode chamber, and the method further comprising:

- taking out the ionic membrane framework from the electroplating chamber before installing the partition, and then installing the partition in the installation position of the ionic membrane framework.

In one embodiment, the method further comprising:

- after pumping out the cleaning solution in the anode chamber and the liquid inlet channel, reinstall the ionic membrane framework between the anode chamber and the cathode chamber.

In one embodiment, the electroplating device includes a diffusion plate, and the method further comprising:

- after the partition is installed and before the cleaning solution is supplied to the cathode chamber, install the diffusion plate on one side of the partition located in the cathode chamber, so that the diffusion plate and the cathode chamber are cleaned simultaneously.

In one embodiment, the partition is provided with through holes. When the partition is installed between the cathode chamber and the anode chamber, the liquid inlet of the through holes is connected to the liquid outlet of the liquid inlet channel, and the liquid outlet of the through holes is located in the cathode chamber for supplying cleaning solution to the cathode chamber.

In one embodiment, the electroplating device further comprises a cathode fluid tank connected to the cathode chamber through a pipeline. When the electroplating device is in cleaning mode, the cleaning solution is stored in the cathode fluid tank for supplying the cleaning solution to the cathode chamber. When the electroplating device is in electroplating mode, the electroplating solution is stored in the cathode fluid tank for supplying the electroplating solution to the cathode chamber.

In one embodiment, the electroplating device also includes an anode fluid tank connected to the anode chamber through a pipeline. When the electroplating device is in cleaning mode, the cleaning solution is stored in the anode fluid tank for supplying the cleaning solution to the anode chamber. When the electroplating device is in electroplating mode, the electroplating solution is stored in the anode fluid tank for supplying the electroplating solution to the anode chamber.

The present invention adopts the partition to separate the cathode chamber and the anode chamber during the cleaning process of electroplating chamber. And it adopts an exhaust pipe to drain the residual cleaning solution in the pipeline, thus avoiding the effect of cleaning solution residues on the ion concentration of the subsequent electroplating solution formulations.

DETAILED DESCRIPTION OF EMBODIMENTS

To provide a detailed description of the technical content, structural features, achieved objectives and effects of the present invention, the following will be described in detail with reference to embodiments and accompanying diagrams.

Figure 1:
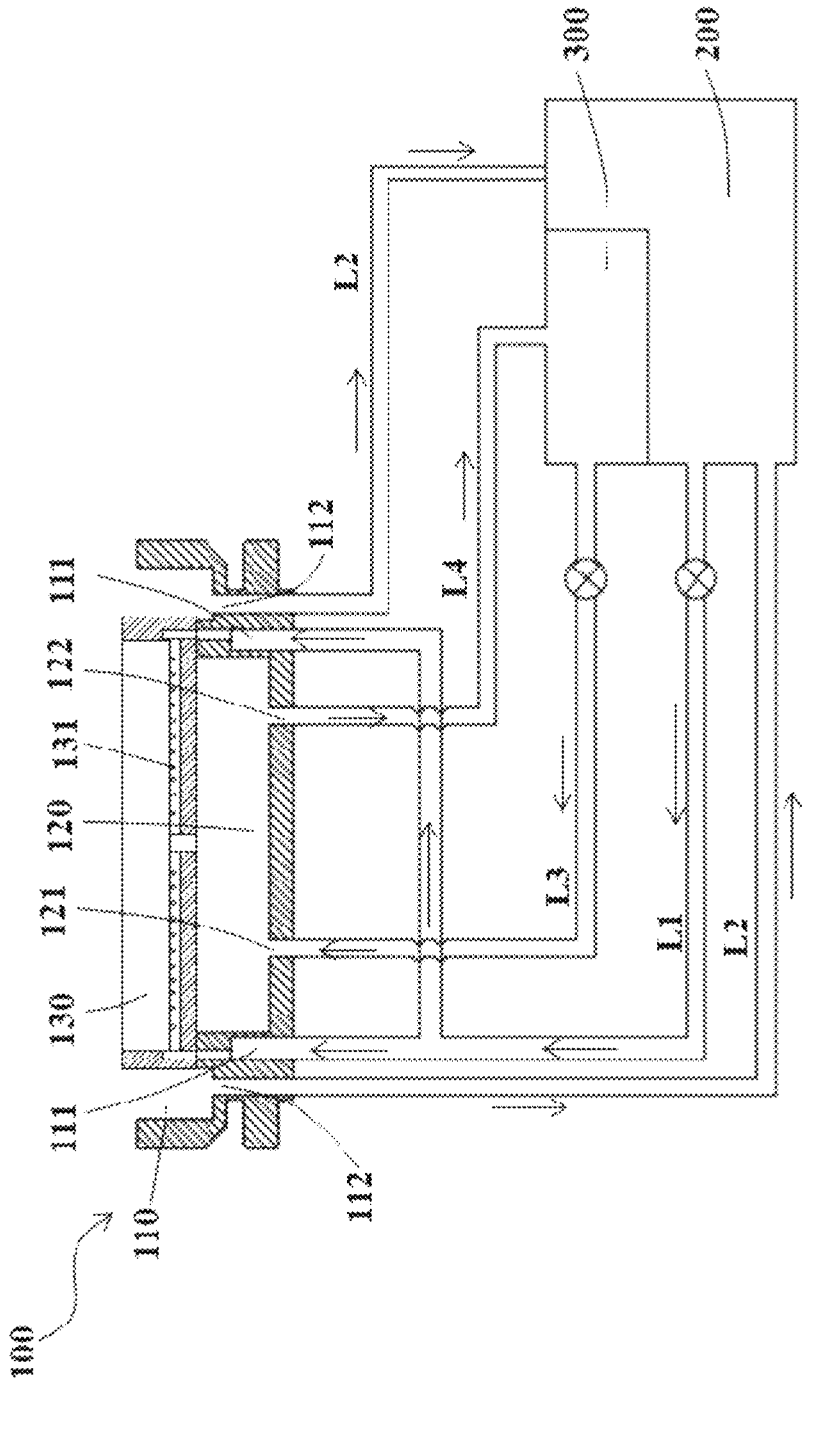
FIG. 1 shows a schematic diagram of an electroplating device according to an embodiment of the present invention.

Please refer to FIG. 1. An electroplating device proposed in an embodiment of the present invention has an electroplating chamber 100, a cathode fluid tank 200 and an anode fluid tank 300. The electroplating chamber 100 has a cathode chamber 110, an anode chamber 120, and an ionic membrane framework 130. The cathode chamber 110 surrounds the periphery of the anode chamber 120, and the ionic membrane framework 130 is provided with an ionic membrane between the cathode chamber 110 and the anode chamber 120. To be specific, the ionic membrane framework 130 is provided at the top of the anode chamber 120, which separates the cathode chamber 110 and the anode chamber 120 into two independent chambers.

The anode chamber 120 has a liquid inlet 121 and a liquid outlet 122, both of which are provided on the bottom wall of the anode chamber 120. Wherein, the liquid inlet 121 of the anode chamber 120 is used for supplying liquid to the anode chamber 120, and the liquid outlet 122 of the anode chamber 120 is used for emptying the liquid in the anode chamber 120.

The cathode chamber 110 has a liquid inlet channel 111 and a liquid outlet 112. Liquid inlet channel 111 is used for supplying liquid to the cathode chamber 110, and the liquid outlet 112 of the cathode chamber 110 is used to empty the liquid inside the chamber. Liquid inlet channel 111 is provided in the sidewall of the anode chamber 120, specifically, the liquid inlet channel 111 is a cavity provided in the sidewall of the anode chamber 120, and its cross-sectional shape is any shape such as arc, rectangle, ring, and so on. Typically, the ionic membrane framework 130 has a plurality of radial inlet branches 131, and each outlet of the liquid inlet channel 111 is connected to one of the liquid inlet branches 131 for supplying liquid to the cathode chamber 110.

In the present embodiment, as shown in FIG. 1, the cathode fluid tank 200 is connected to the liquid inlet channel 111 for supplying liquid to the cathode chamber 110 through the liquid supply line L1, and to the liquid outlet 112 of the cathode chamber 110 through the liquid return line L2, so that the liquid in the cathode fluid tank 200 circulates between the cathode chamber 110 and the cathode fluid tank 200. Similarly, the anode fluid tank 300 is connected to the liquid inlet 121 of the anode chamber 120 through the liquid supply line L3, and to the liquid outlet 122 of the anode chamber 120 through the liquid return line L4, thereby circulating the liquid in the anode fluid tank 300 between the anode chamber 120 and the anode liquid tank 300.

Figure 2:
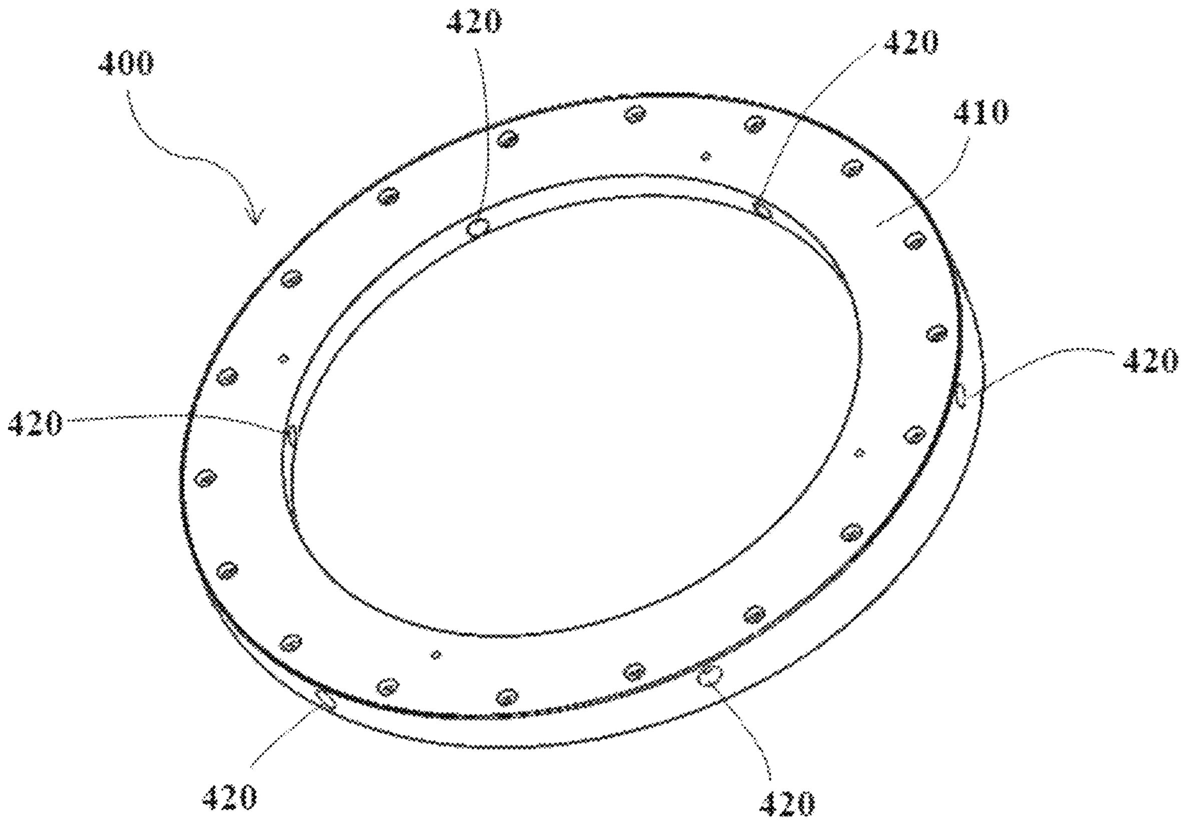
FIG. 2 illustrates a perspective view of a partition according to an embodiment of the present invention.
Figure 3:
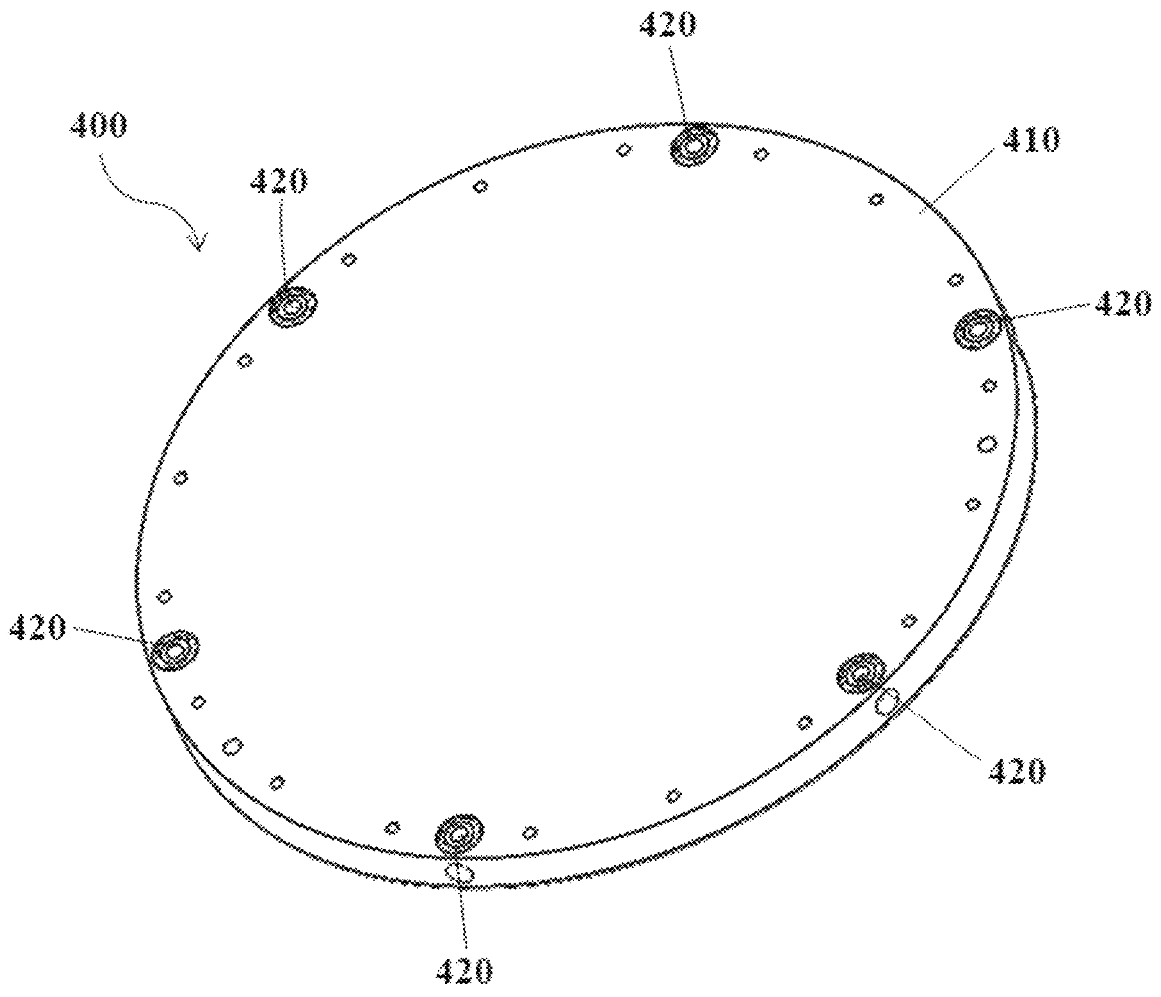
FIG. 3 illustrates another perspective view of the partition according to an embodiment of the present invention.
Figure 4:
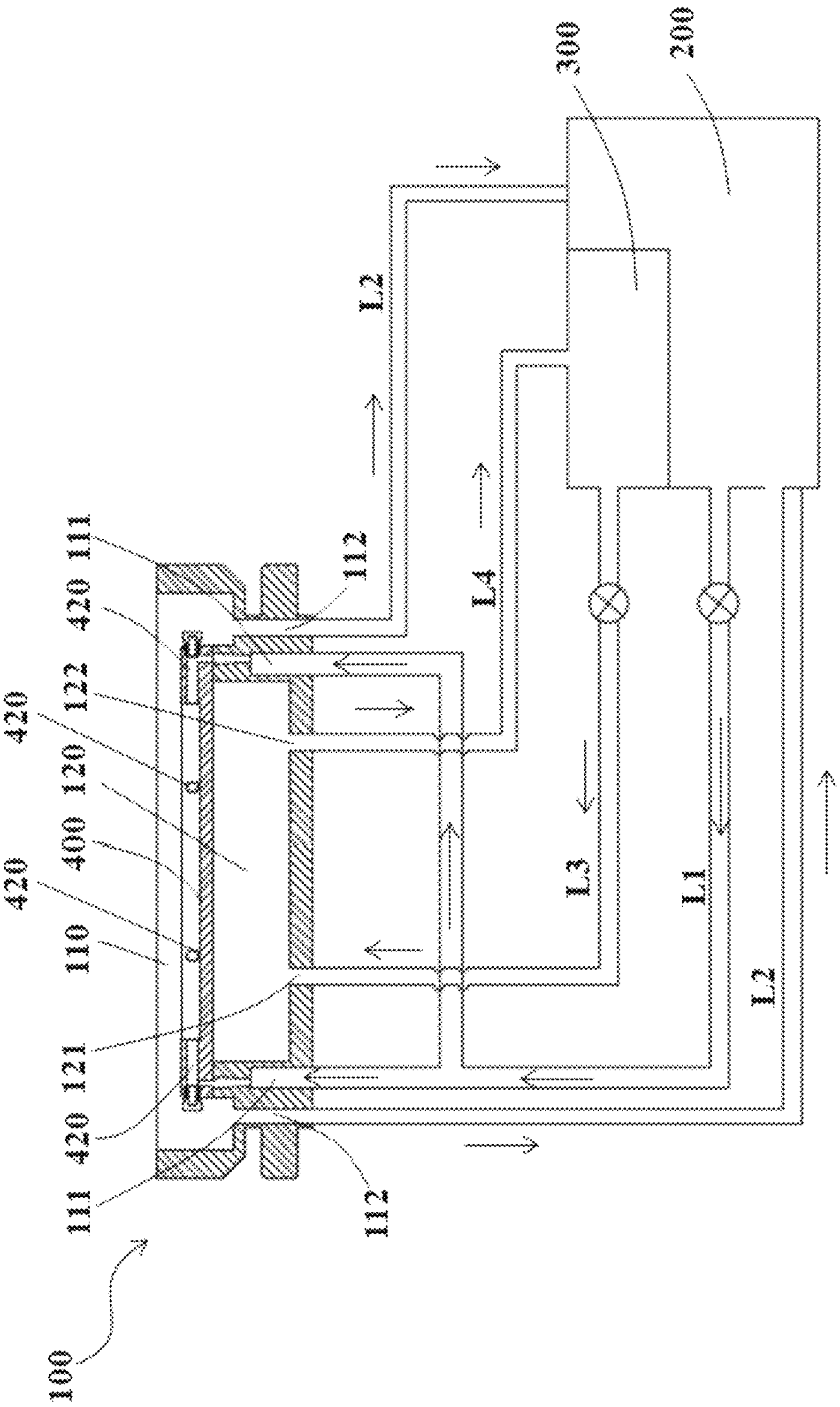
FIG. 4 shows a schematic diagram of an electroplating device after installing a partition according to an embodiment of the present invention.
Figure 5:
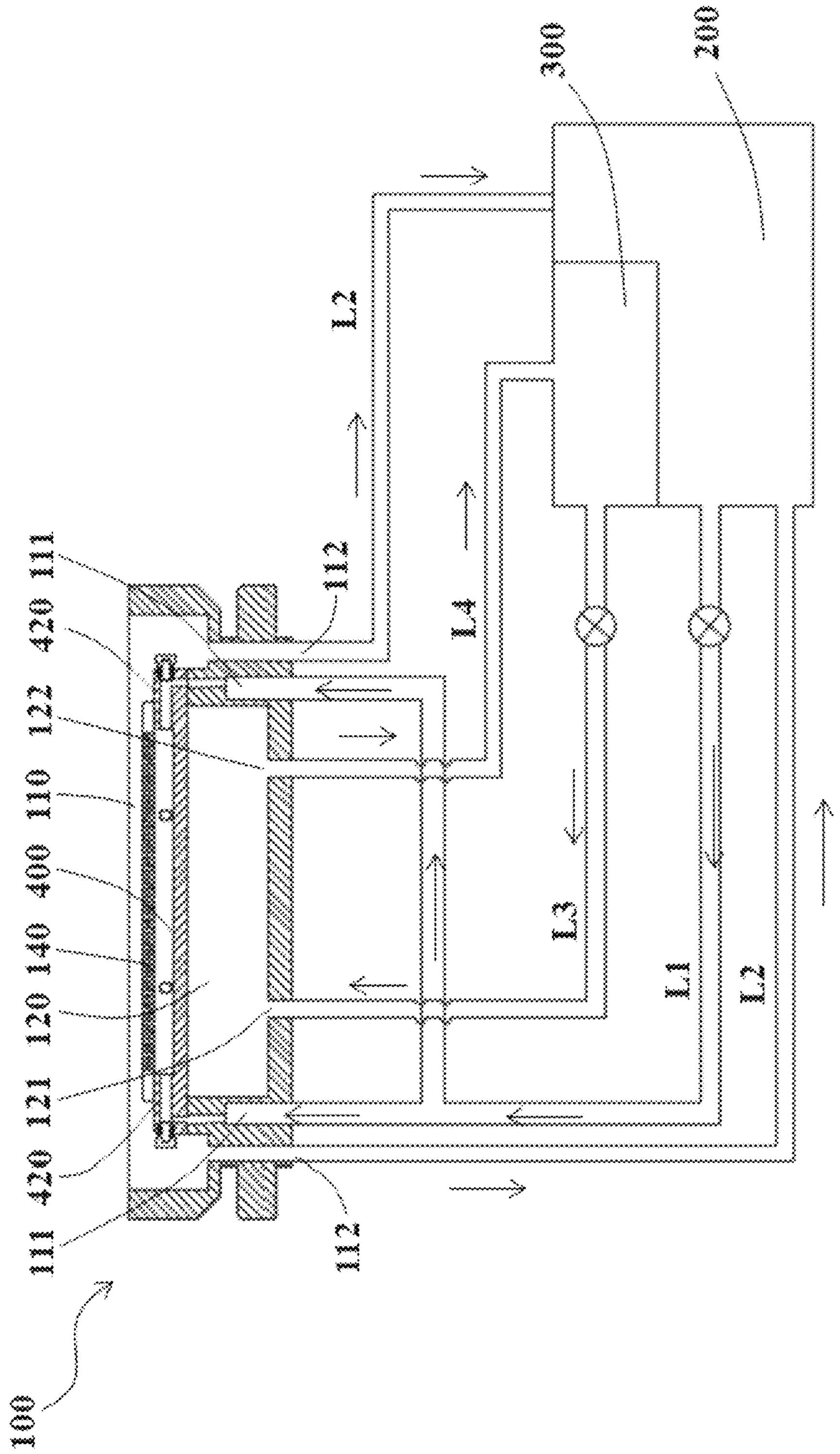
FIG. 5 illustrates a schematic diagram of an electroplating device after installing a partition and a diffusion plate according to an embodiment of the present invention.
Figure 6:
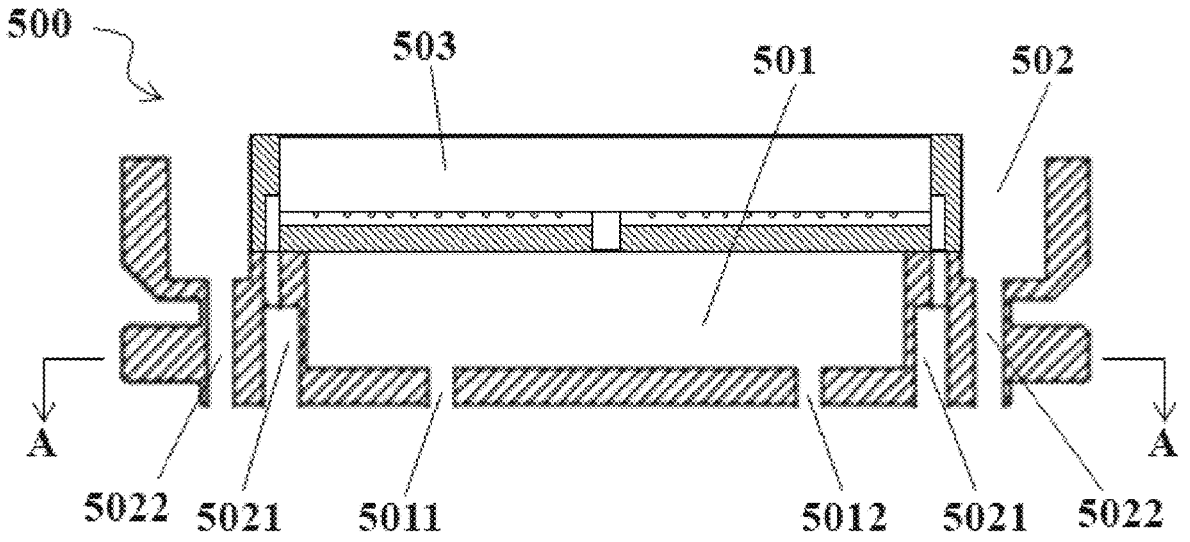
FIG. 6 (Prior Art)
FIG. 6 is a sectional view showing an electroplating chamber of an electroplating device in the prior art.
Figure 7:
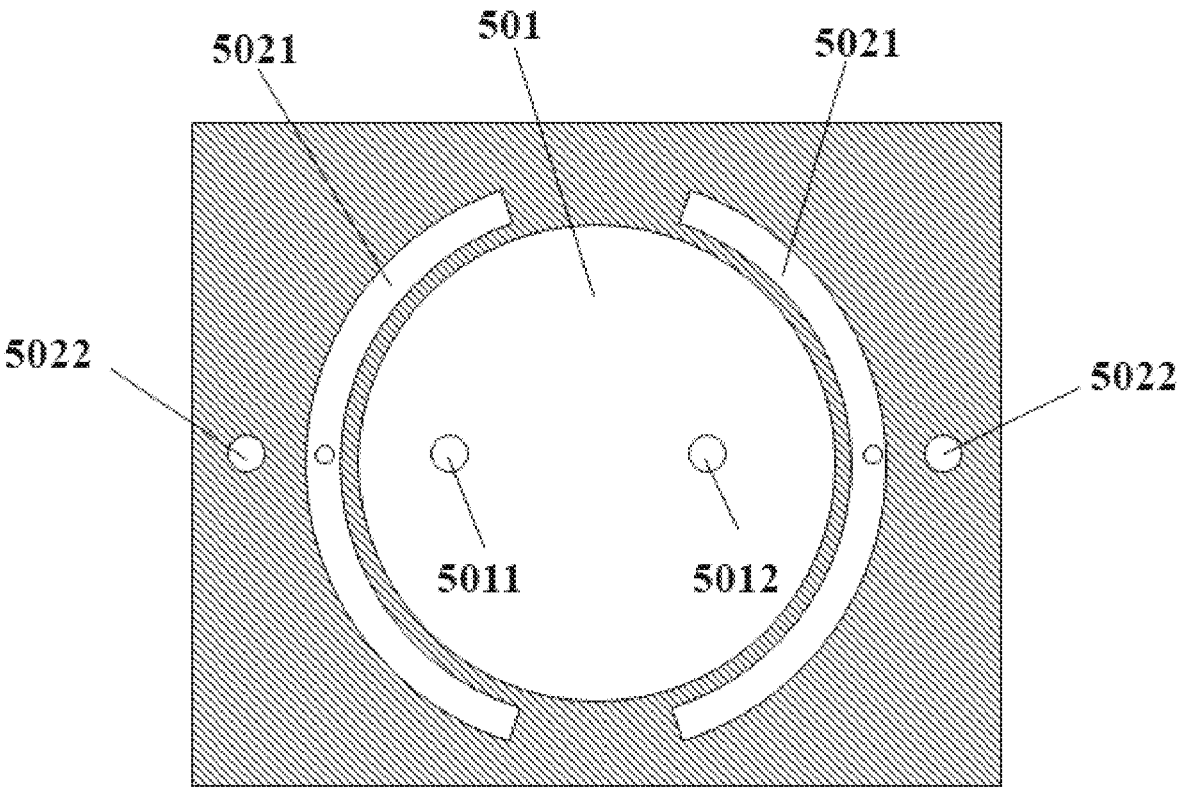
FIG. 7 (Prior Art)
FIG. 7 shows a sectional view in the A-A direction in FIG. 6.

FIG. 2 and FIG. 3 are the structure diagrams of the partition used in cleaning the electroplating device of the present invention. Partition 400 comprises a plate body 410 and through holes 420 provided on the plate body 410. When the electroplating device is to be cleaned, partition 400 is mounted between cathode chamber 110 and anode chamber 120, more specifically, partition 400 is mounted at the mounting position of the ionic membrane framework 130. The partition 400 replaces the ionic membrane framework 130, separating the cathode chamber 110 and the anode chamber 120 into two separate chambers. In the present embodiment, the outline of the plate body 410 is circular, the peripheral edge has upward raised steps, and through holes 420 are processed into L-shaped ones at the steps. As shown in FIG. 4, when the partition 400 is installed between the cathode chamber 110 and the anode chamber 120, the liquid inlet of the through holes 420 is aligned with and connected to the liquid outlet of the liquid inlet channel 111 of the cathode chamber 110, and the liquid outlet of the through holes 420 is located within the cathode chamber 110, so that liquid can be supplied to the cathode chamber 110 via the liquid inlet channel 111 and the through holes 420. It can be understood that the plate body 410 of the partition 400 may also not set the through holes 420 connected to the liquid inlet channel 111 of the cathode chamber 110 in other embodiments. In other embodiments, the partition 400 is used merely to block the mutual flow of fluid between the cathode chamber 110 and the anode chamber 120. And when the partition 400 is mounted between the cathode chamber 110 and the anode chamber 120, it does not block the liquid outlet of the liquid inlet channel 111 that supplies liquid to the cathode chamber 110, which in turn does not affect the supply of liquid from the cathode fluid tank 200 to the cathode chamber 110.

The method for cleaning an electroplating device proposed by the present invention comprises the following steps:

Step 1, if the ionic membrane framework 130 has been installed in the electroplating chamber 100, remove the ionic membrane framework 130 from the electroplating chamber 100, clean the ionic membrane framework 130 separately, and perform Step 2; if the ionic membrane framework 130 has not been installed in the electroplating chamber 100, then perform Step 2;

Step 2, provide the partition 400, install the partition 400 between the cathode chamber 110 and the anode chamber 120, isolating the cathode chamber 110 from the anode chamber 120, as shown in FIG. 4;

Step 3, store the cleaning solution in the cathode fluid tank 200, which can be acid, lye or ultra-pure water. The cathode fluid tank 200 supplies the cleaning solution to the cathode chamber 110 to clean the chamber. Typically, the cathode chamber 110 is cleaned multiple times by acid, lye and ultra-pure water in sequence, respectively;

Step 4, store the cleaning solution in the anode fluid tank 300, which can be acid, lye or ultra-pure water. The anode fluid tank 300 supplies the cleaning solution to the anode chamber 120 to clean the chamber. Typically, the anode chamber 120 is cleaned multiple times by acid, lye and ultra-pure water in sequence, respectively;

Step 5, when the cathode chamber 110 and the anode chamber 120 are cleaned completely, the cleaning solution of the cathode chamber 110 is drained through the liquid outlet 112 of the cathode chamber 110, and returned to the cathode fluid tank 200 through the liquid return line L2, and then the returned cleaning solution is drained form the cathode fluid tank 200; the cleaning solution in the anode chamber 120 is drained through the liquid outlet 122 of the anode chamber 120, and returned to the anode fluid tank 300 through the liquid return line L4, and then the returned cleaning solution is drained from the anode fluid tank 300;

Step 6, remove the partition 400 from between the cathode chamber 110 and the anode chamber 120;

Step 7, provide a first exhaust pipe (the figure is not shown), one end of the first exhaust pipe is placed into the liquid inlet channel 111 provided in the sidewall of the anode chamber 120, the other end is connected to a pump (the figure is not shown), and the cleaning solution in the liquid inlet channel 111 is pumped out through the pump;

Step 8, similar to Step 7, provide a second exhaust pipe (the figure is not shown), one end of the second exhaust pipe is placed into the anode chamber 120, the other end is connected to a pump (the figure is not shown), and the cleaning solution in the anode chamber 120 is pumped out through the pump;

Step 9, after pumping out the cleaning solution in the anode chamber 120 and the liquid inlet channel 111, reinstall the ionic membrane framework 130 between the cathode chamber 110 and the anode chamber 120.

The electroplating device further comprises a diffusion plate 140, which can be cleaned individually. Alternatively, as shown in FIG. 4, after installing the partition 400 and before supplying the cleaning solution to the cathode chamber 110, install the diffusion plate 140 on one side of the partition 400 located in the cathode chamber 110, and clean the diffusion plate 140 and the cathode chamber 110 at the same time.

In the foregoing method for cleaning an electroplating device, Step 3 and Step 4 are carried out simultaneously, that is, after the cathode chamber 110 and the anode chamber 120 are separated by the partition 400, the two chambers are cleaned independently at the same time. After the cleaning of above-described electroplating device, when the electroplating device is to be used for electroplating the substrate, the cathode fluid tank 200 empties the cleaning solution for storing the electroplating solution and supplies the electroplating solution to the cathode chamber 110. The anode fluid tank 300 empties the cleaning solution for storing the electroplating solution and supplies the electroplating solution to the anode chamber 120.

In the present invention, when cleaning the electroplating device, the cathode chamber 110 and the anode chamber 120 are separated by using the partition 400 instead of the ionic membrane framework 130, so that the two chambers are cleaned independently. And after the electroplating chamber 100 is cleaned, an exhaust pipe is used to empty the residual cleaning solution in the anode chamber 120 and the liquid inlet channel 111 arranged in the sidewall of the anode chamber 120, so that there is no cleaning solution residue after the electroplating chamber is cleaned, thereby eliminating the effect of the cleaning solution residue on the ionic concentration ratio of the electroplating solution in the electroplating solution preparation procedures.

In conclusion, the present invention has disclosed the relevant technology specifically and in detail through the above-described embodiments and related diagrams, so that those skilled in the art can implement it accordingly. However, the above description is intended only to explain the present invention, and should not be considered as limiting the present invention. The protection scope of the present invention should be defined by the attached claims. And various details in this specification can also be modified or changed in various ways based on different viewpoints and applications without departing from the spirit of the present invention.

What is claimed is:

1. A method for cleaning an electroplating device, the electroplating device comprising an electroplating chamber having a cathode chamber and an anode chamber, a liquid inlet channel being arranged in a sidewall of the anode chamber for supplying liquid to the cathode chamber, the method comprising the following steps:

providing a partition, which is installed between the cathode chamber and the anode chamber to separate the cathode chamber and the anode chamber;

supplying cleaning solution into the cathode chamber to clean the cathode chamber;

supplying cleaning solution into the anode chamber to clean the anode chamber;

after the cathode chamber and the anode chamber are cleaned, draining the cleaning solution in the cathode chamber and the anode chamber through their respective liquid outlets;

removing the partition from between the cathode chamber and the anode chamber;

providing a first exhaust pipe having two ends, one end of the first exhaust pipe being placed into the liquid inlet channel arranged in the sidewall of the anode chamber, the other end of the first exhaust pipe being connected to a first pump, draining the cleaning solution in the liquid inlet channel through the first pump;

providing a second exhaust pipe having two ends, one end of the second exhaust pipe being placed into the anode chamber, the other end of the second exhaust pipe being connected to a second pump, draining the cleaning solution in the anode chamber through the second pump.

2. The method for cleaning an electroplating device according to claim 1, wherein the electroplating device also comprises an ionic membrane framework arranged between the anode chamber and the cathode chamber, the method further comprises:

taking out the ionic membrane framework from the electroplating chamber before installing the partition, and then installing the partition in an installation position of the ionic membrane framework.

3. The method for cleaning an electroplating device according to claim 2, further comprising:

after draining the cleaning solution in the anode chamber and the liquid inlet channel, reinstall the ionic membrane framework between the anode chamber and the cathode chamber.

4. The method for cleaning an electroplating device according to claim 1, wherein the electroplating device includes a diffusion plate, the method further comprising:

after the partition is installed and before the cleaning solution is supplied to the cathode chamber, install the diffusion plate on one side of the partition located in the cathode chamber, so that the diffusion plate and the cathode chamber are cleaned simultaneously.

5. The method for cleaning an electroplating device according to claim 1, wherein the partition is provided with through holes, when the partition is installed between the cathode chamber and the anode chamber, a liquid inlet of the through holes is connected to a liquid outlet of the liquid inlet channel, and a liquid outlet of the through holes is located in the cathode chamber for supplying cleaning solution to the cathode chamber.

6. The method for cleaning an electroplating device according to claim 1, wherein the electroplating device further comprises a cathode fluid tank connected to the cathode chamber through a pipeline, when the electroplating device is in cleaning mode, the cleaning solution is stored in the cathode fluid tank for supplying the cleaning solution to the cathode chamber, when the electroplating device is in electroplating mode, an electroplating solution is stored in the cathode fluid tank for supplying the electroplating solution to the cathode chamber.

7. The method for cleaning an electroplating device according to claim 1, wherein the electroplating device also includes an anode fluid tank connected to the anode chamber through a pipeline, when the electroplating device is in cleaning mode, the cleaning solution is stored in the anode fluid tank for supplying the cleaning solution to the anode chamber, when the electroplating device is in electroplating mode, an electroplating solution is stored in the anode fluid tank for supplying the electroplating solution to the anode chamber.

* * * * *